(12) United States Patent
Hoefken (10) Patent No.: US 7,784,769 B2
(45) Date of Patent: Aug. 31, 2010

(54) AGITATING DEVICE AND METHOD FOR SEWAGE TREATMENT

(75) Inventor: Marcus Hoefken, Erlangen (DE)

(73) Assignee: Invent Umwelt- und Verfahrenstechnik AG, Erlangen (DE)

( * ) Notice: Subject to any disclaimer, the term of this patent is extended or adjusted under 35 U.S.C. 154(b) by 386 days.

(21) Appl. No.: 11/886,950

(22) PCT Filed: Apr. 5, 2006

(86) PCT No.: PCT/EP2006/003077

§ 371 (c)(1),
(2), (4) Date: Nov. 13, 2007

(87) PCT Pub. No.: WO2006/108538

PCT Pub. Date: Oct. 19, 2006

(65) Prior Publication Data

US 2009/0127213 A1    May 21, 2009

(30) Foreign Application Priority Data

Apr. 12, 2005    (DE) .................... 10 2005 016 948

(51) Int. Cl.
C02F 3/00    (2006.01)

(52) U.S. Cl. .............. 261/85; 261/86; 261/87; 210/220; 210/150; 210/620; 210/629

(58) Field of Classification Search ........... 210/220, 210/150, 620, 629; 261/85–87
See application file for complete search history.

(56) References Cited

FOREIGN PATENT DOCUMENTS

| | | |
|---|---|---|
| DE | 4218027 | 12/1992 |
| DE | 29803497 | 6/1999 |
| DE | 19826098 | 12/1999 |
| SU | 1007714 | 3/1983 |

Primary Examiner—Chester T Barry
(74) Attorney, Agent, or Firm—Manabu Kanesaka (57) ABSTRACT

The invention relates to an agitating device, in which a hyperboloid agitating body (6) is connected to a drive mechanism (2, 3) by means of a shaft (4). Several ribs (7) running from the circumferential boundary (Ur) in the direction of the shaft (4) are provided on the upper side (O) of the agitating body (6). According to the invention, the efficiency of the agitating device may be improved, whereby a height (h1) of the ribs (7) at least incrementally increases from the circumferential boundary (Ur) of the agitating body (6) in the direction of the shaft (4).

15 Claims, 9 Drawing Sheets

AGITATING DEVICE AND METHOD FOR SEWAGE TREATMENT

The invention relates to an agitating device as defined in the preamble of claim 1. Furthermore it relates to a method for the treatment of sewage.

A generic agitating device is known, for example, from DE 42 18 027 A1 as well as DE 298 03 497 U1.

The known agitating devices have a hyperboloid-like agitating body on whose upper side are located a plurality of ribs running from the circumferential boundary in the direction of a shaft. One height of the ribs either remains constant or decreases from the circumferential boundary in the direction of the shaft. Such hyperboloid-like agitating bodies have prevailed due to their good agitating properties, in particular in the area of sewage treatment. Notwithstanding, a further increase in the efficiency of such agitating bodies would be desirable.

The object of the invention is to specify an agitating device with improved efficiency. In accordance with a further goal of the invention, an as efficient as possible method is to be specified for sewage treatment.

This object is solved by the features of claims 1 and 14. Useful embodiments result from the features of claims 2 to 13 and 15.

According to provisions of the invention it is provided that a first height of the ribs increases at least sectionally from the circumferential boundary of the agitating body in the direction of the shaft.—Surprisingly this results in a significant increase in the efficiency of the agitating device. Experiments have shown that efficiency can be increased by more than 20% when a hyperboloid-like agitating body equipped with the ribs provided by the invention is used. In suitable forms of embodiment of the invention an increase in efficiency of approximately 30% was even achieved.

"Height" of the ribs is used to mean the length of a perpendicular extending from a top edge of the ribs to the surface of the hyperboloid-like agitating body.

According to an embodiment of the invention the height increases in a first section running from the circumferential boundary in the direction of the shaft and decreases in a second section running from a first end of the first section further in the direction of the shaft. In a top view of the upper side, the ribs can have a bend which can in particular be formed hyperbolically. Ribs with the aforementioned features enable an efficient transmission of the rotation energy of the agitating body to a liquid surrounding this.

According to a further particularly advantageous embodiment the agitating body has a plurality of breakthroughs provided in the vicinity of the shaft. The breakthroughs are usefully arranged at regular intervals, preferably at the same radial distance. On the one hand the suggested breakthroughs enable an escape of gas bubbles which are possibly being created underneath the agitating body. But they also enable the formation of a current directed axially to the bottom of a basin into which the agitating body protrudes. Such a current contributes to the removal of deposits which may be forming beneath the agitating body, for example sand and similar.

In accordance with a further useful embodiment a plurality of further ribs running in the direction of the circumferential boundary on an underside of the agitating body opposite the upper side is provided. The further ribs can run radially. A second height of the further ribs increases usefully in a section running from a central area of the agitating body in the direction of the circumferential boundary and decreases in a fourth section running from a second end of the third section further in the direction of the circumferential boundary. In addition the further ribs can each have a horizontal section to support an agitating element stacked beneath for transport or storage purposes. The suggested further ribs generate a negative pressure during a rotation of the agitating body. Due to this, liquid located above the agitating body is suctioned in through the breakthroughs provided in the vicinity of the ribs and accelerated axially in the direction of a bottom of a sewage basin. This can further increase the efficiency of the agitating action. Experiments have shown that the provision of further ribs causes an increase in efficiency of approximately 8 to 10%. Apart from this, deposits underneath the agitating body caused by the axial current directed to the bottom of a basin formed by the action of the further ribs in combination with the break-throughs can be safety and reliably avoided.

The ribs run usefully from the circumferential boundary up to near the shaft. This means that their length essentially extends over the entire radial distance of the upper side. In contrast the further ribs do not extend usefully up to the circumferential boundary. Their radial extent is advantageously no more than half as large as that of the ribs.

According to an alternate object of the invention, an agitating device can also be provided to increase the efficiency on which device a hyperboloid-like agitating body is connected to a drive unit via a shaft, wherein the agitating body has a plurality of breakthroughs in the vicinity of the shaft, and wherein a plurality of further ribs is provided on an underside of the agitating body which ribs run in the direction of the circumferential boundary. Reference is made to the above descriptions regarding the embodiments of the further ribs. The alternate object of the invention described here can naturally also be combined with the previously described ribs provided on the upper side of the agitating body and their advantageously embodiment forms.

According to a further embodiment the agitating body together with the ribs and/or the further ribs is manufactured from one piece, preferably from a fiber-reinforced plastic. This simplifies manufacturing and increases the stability of the suggested agitating body. In particular conventional and easy-to-control manufacturing technology can be used.

According to a further embodiment a sewage treatment unit with at least one agitating device provided by the invention is provided, wherein the agitating element retained on the shaft protrudes into a basin and the drive unit is retained on a frame outside the basin. The frame can be a bridge-like frame extending from the edge of the basin in the direction of the basin. The frame can be supported on a bottom of the basin. But it is also possible that the agitating body is retained on a tower-like frame completely supported on the bottom of the basin, wherein in turn a drive unit is retained outside the basin. Naturally it is also possible to drive the agitating body via a drive unit which is retained on a frame as a submerged unit below a level of the liquid to be agitated.

According to a further embodiment it is provided that an aeration unit is provided. Such an aeration unit enables a particularly efficient reduction of pollutants in the sewage during a sewage treatment. This can be pipes or hoses installed on the bottom of the basin which are provided with openings, slits and similar for the aeration. But the aeration unit can also be part of the agitating device. In this way for example the air can be pressed into the liquid with a frame protruding into the basin or with the shaft of the agitating device.

According to further provisions of the invention a method is provided for sewage treatment consisting of the following steps:

a) Providing a basin to hold the sewage, an agitating device as provided by the invention to circulate the sewage in the basin as well as an aeration device provided in the basin, b) Filling the basin with sewage, c) Aerating the sewage with the aeration device for a specified amount of time, d) Circulating the sewage with the agitating device for a further specified amount of time, e) Turning off the agitating device so that a sludge contained in the sewage can settle and f) Removing the treated sewage from the basin.

The steps c) and d) can be repeated alternately a plurality of times. It is also possible to perform step d) before step c). The suggested method enables a particularly efficient reduction of pollutants contained in the sewage.

Examples will now be used to describe the invention in more detail based on the drawings. The figures are listed below.

Figure 1:
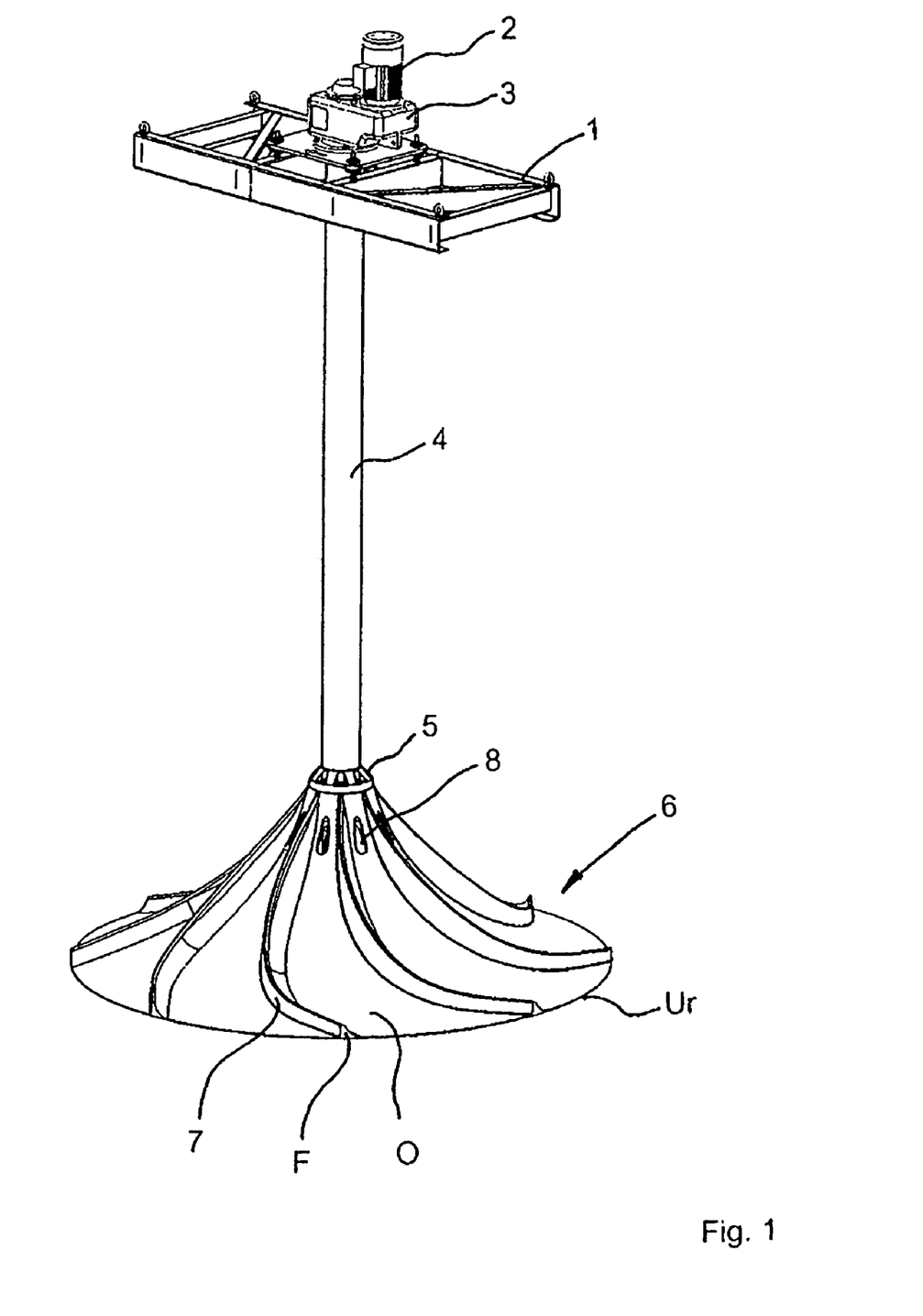
FIG. 1 A foreshortened view of an agitating device.
Figure 2:
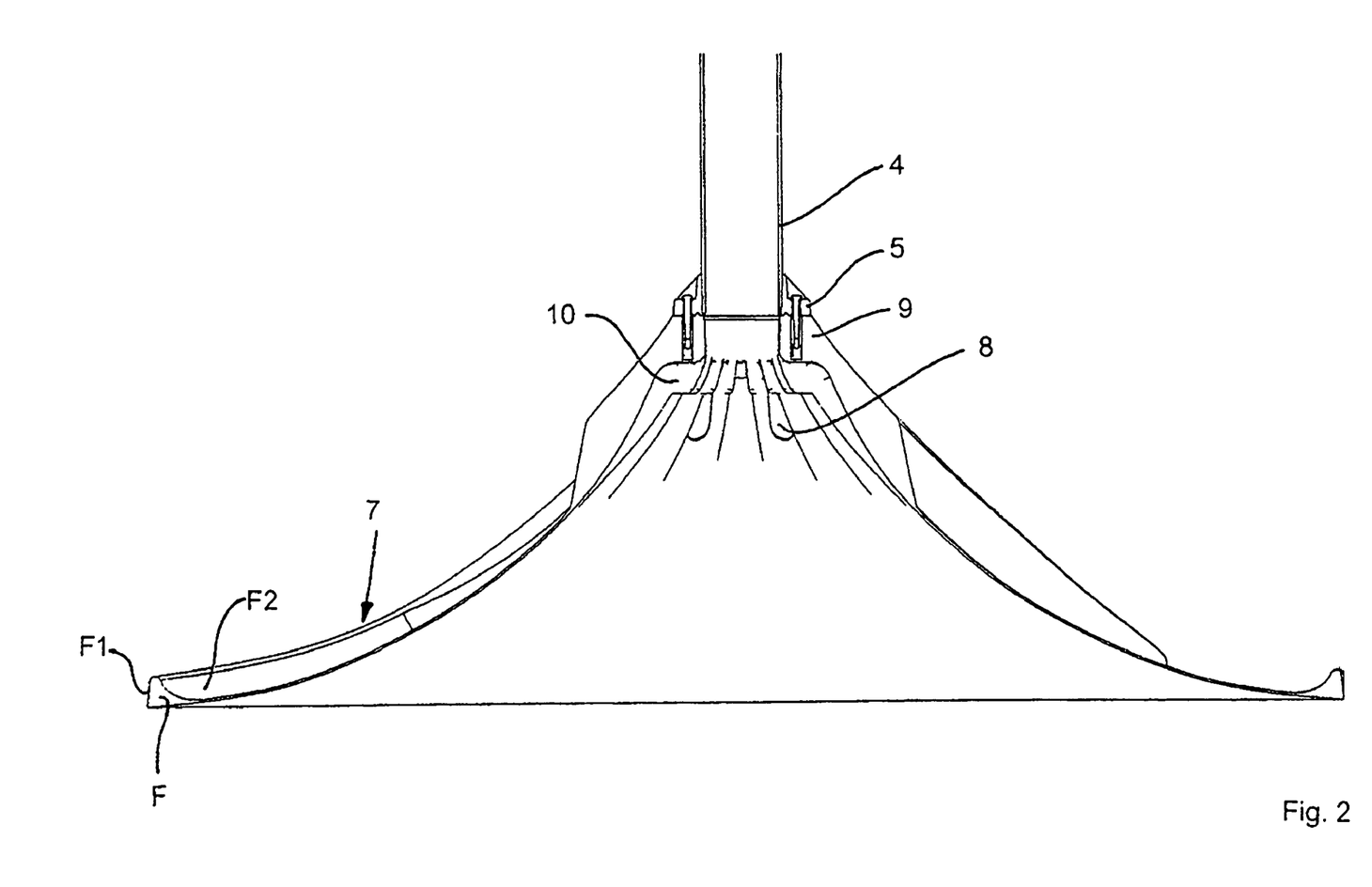
FIG. 2 A cross sectional view through the agitating body as per FIG. 1.
Figure 3:
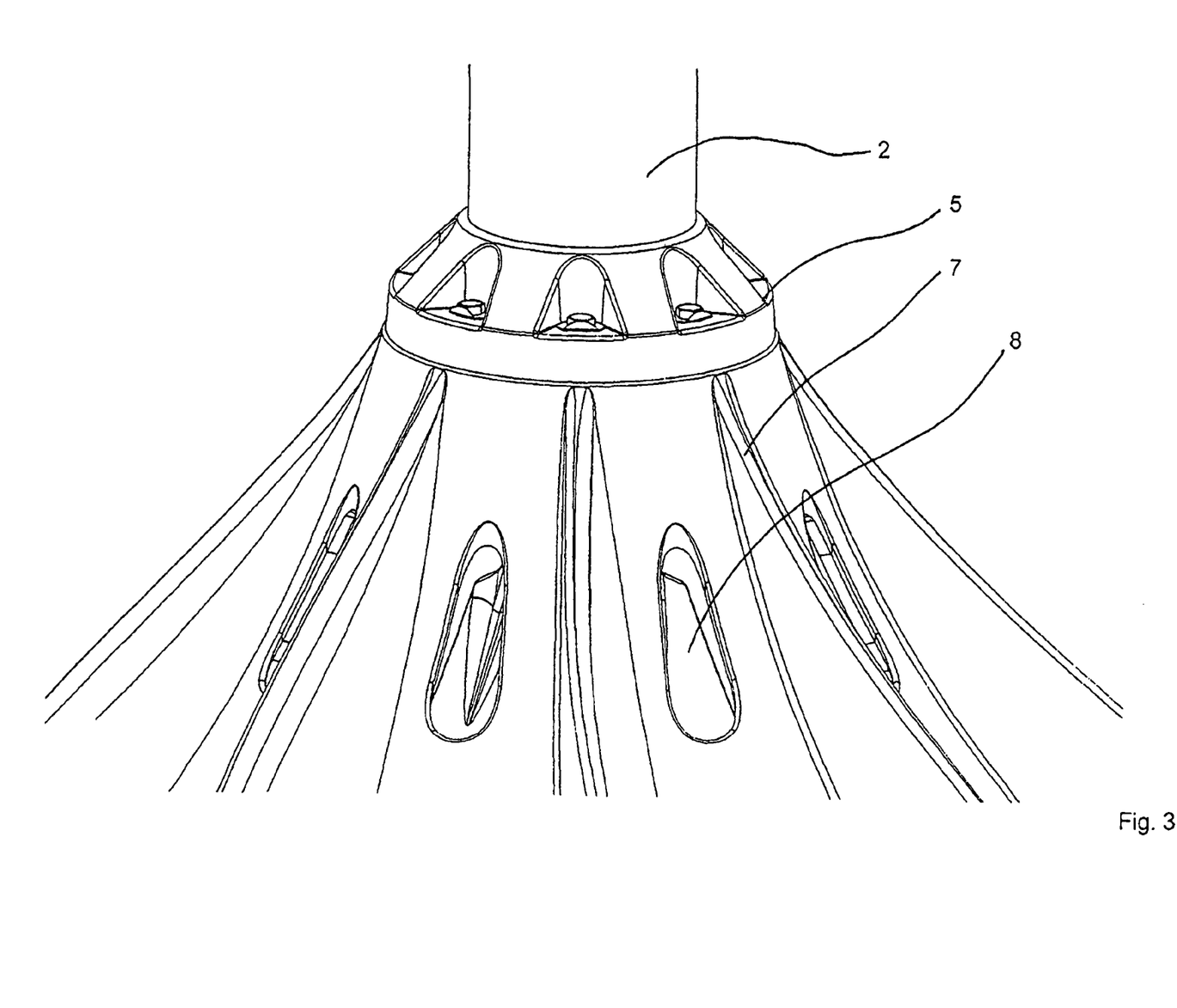
FIG. 3 A foreshortened detail view of the agitating body as per FIG. 1.
Figure 5:
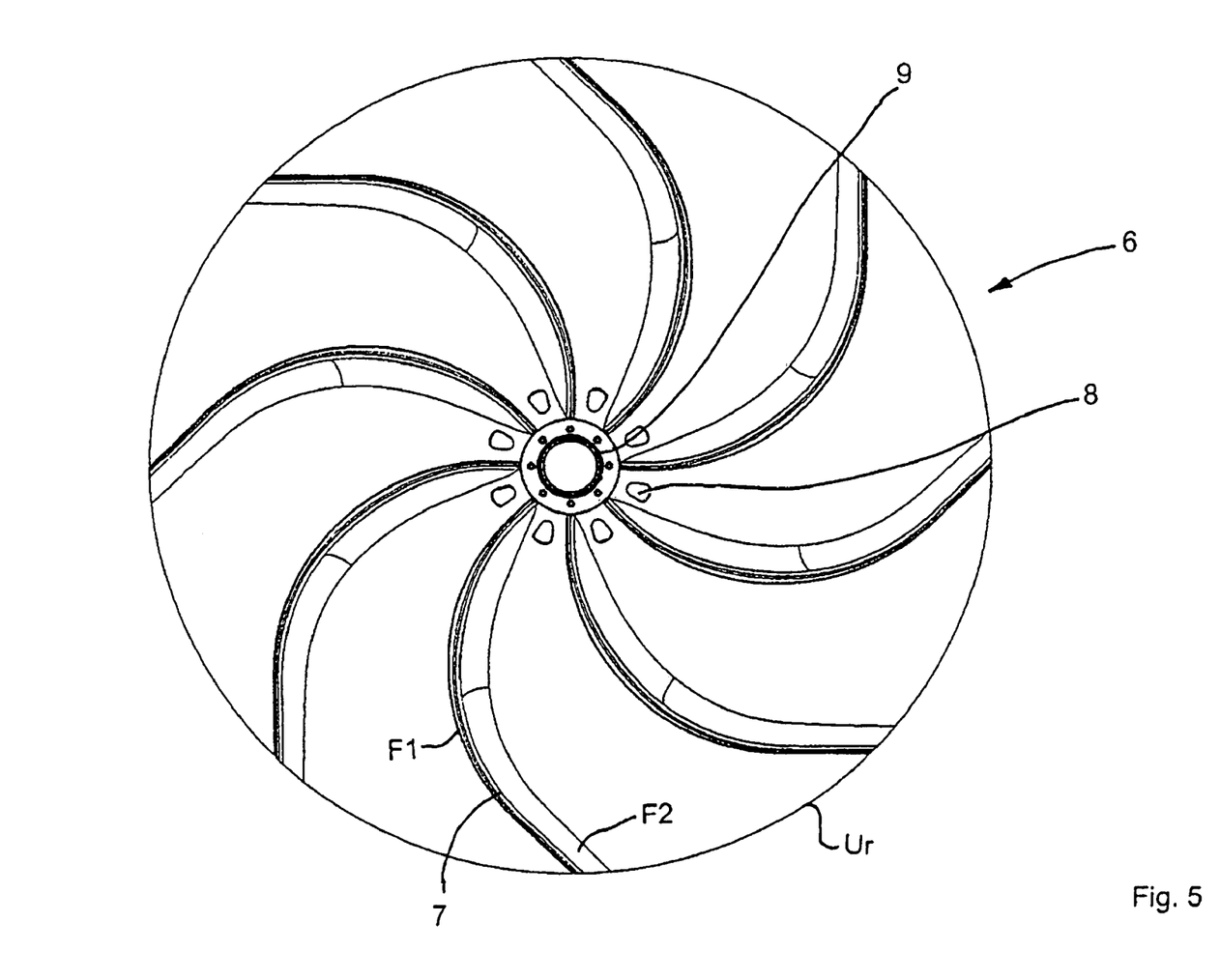
FIG. 5 A view of the top of the agitating body as per FIG. 4.

FIG. 1 shows an agitating device on which a drive device 2 with gearing 3 is retained on a frame 1 shown sectionally. A shaft 4 extending from the gearing 3 which shaft consists of a pipe made of fiber-reinforced plastic for example. An agitating body 6 preferably made of fiber-reinforced plastic is mounted on a flange 5 provided on the end of the shaft 4. The agitating body 6 has a hyperboloid-like shape. Ribs 7 are provided on its upper side O. A cross sectional area F of the ribs 7 is asymmetrical due to a steeply rising edge and a flatly falling edge. As is particularly shown in combination view with FIG. 5, the ribs 7 extend from a circumferential boundary Ur of the agitating body 6 in the direction of the shaft 4. The ribs 7 are bent, preferably hyperboloid-like. A steep edge of the profile creating the ribs 7 is designated in FIG. 5 with the reference sign F1. A flat falling edge is designated as reference sign F2.

In FIG. 1 to 5 breakthroughs which are provided in the vicinity of the shaft 4 or in the vicinity of a mounting section 9 of the agitating body 6 are marked with reference sign 8. The breakthroughs 8 are located between the ribs 7. They have an elliptical or slit-like form and stretch essentially parallel to the ribs 7.

Figure 4:
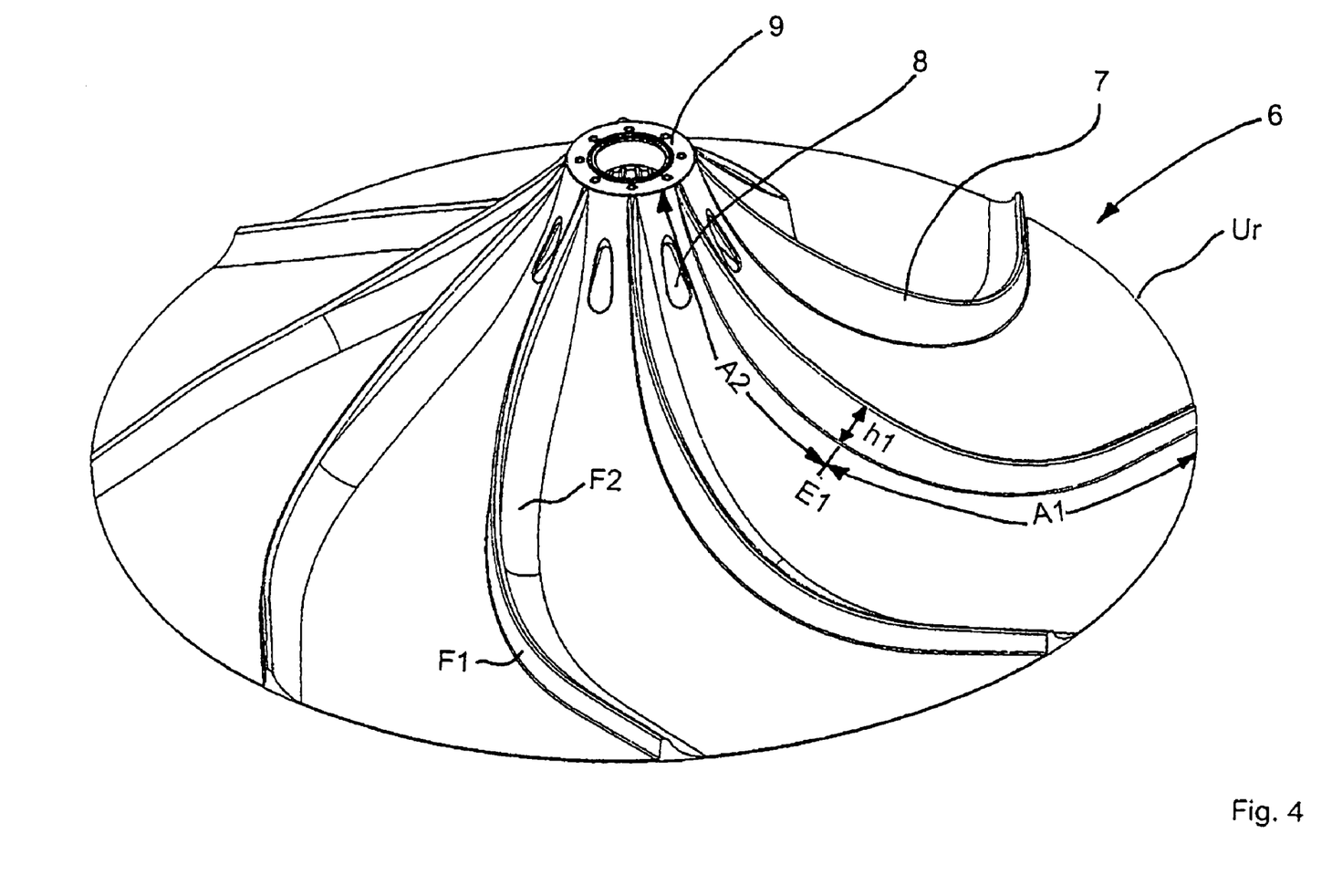
FIG. 4 A foreshortened view of the agitating body as per FIG. 1.

As is particularly shown in FIG. 4, a first height h1 increases continuously in a first section A1 running from the circumferential boundary Ur in the direction of the mounting section 9. The first height h1 is at its maximum on a first end E1 of the first section A1. The first height h1 decreases continuously in a second section A2 extending from the first end E1 in the direction of the mounting section 9. In the vicinity of the mounting section 9 it is equal to zero. A ratio of the lengths of the sections A1/A2 can be in the range from 0.5 to 1.5.

Figure 6:
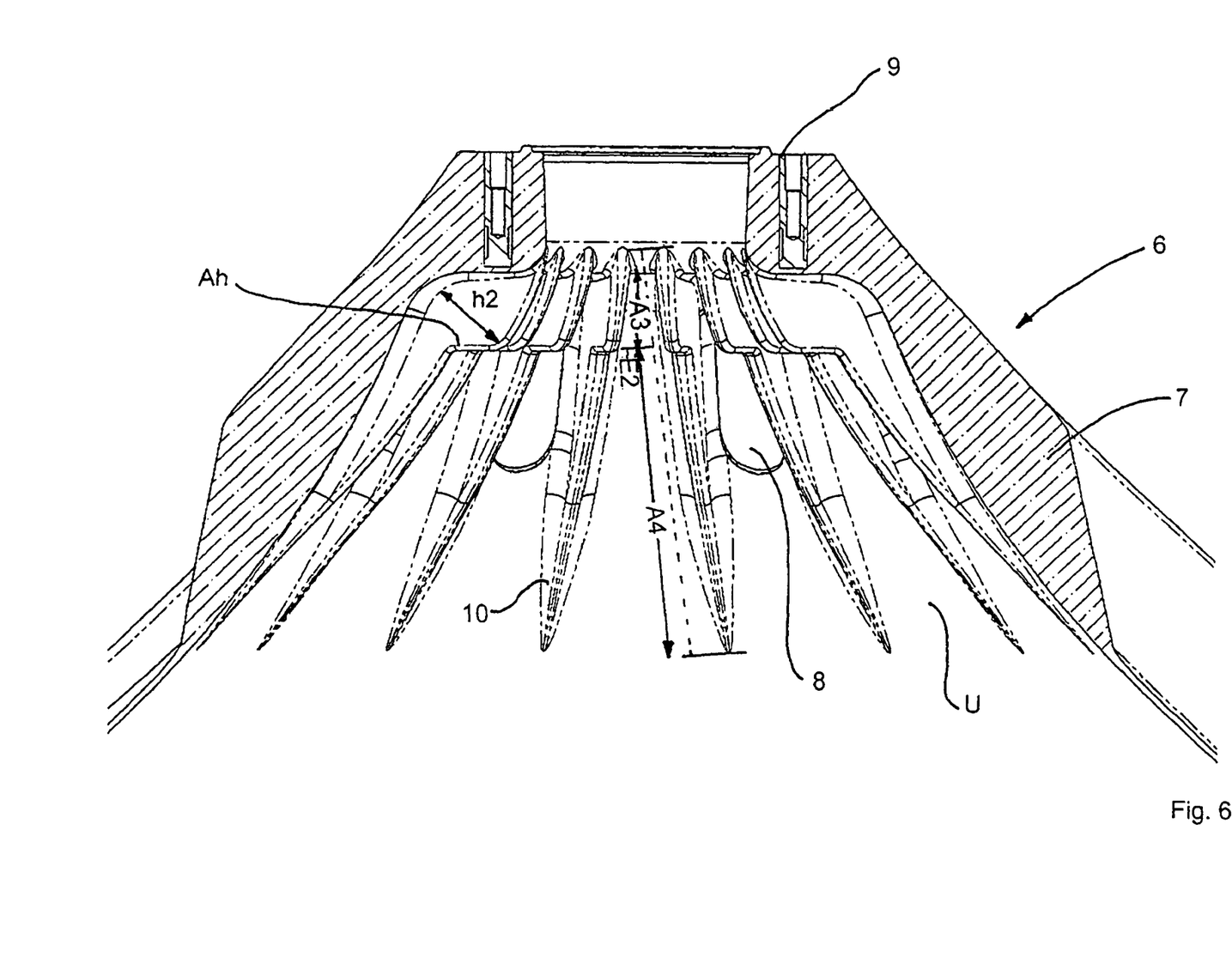
FIG. 6 A foreshortened partially broken up view of the agitating body as per FIG. 1, FIG. 7 The sinking speeds achieved with various-agitating bodies based on the distance away from the agitating, body, FIG. 8 The power transfer for the basin volume for an agitating body provided by the invention in comparison to a conventional agitating body and FIG. 9 The rated motor power of the basin volume for an agitating body as provided by the invention in comparison to a conventional agitating body.

FIG. 6 shows a foreshortened view of a partially broken up agitating body 6. Further ribs are provided on the underside U which ribs stretch from the mounting section 9 or a central area of the agitating body 6 radially in the direction of the (not visible here) circumferential boundary Ur. Similar to the ribs 7 provided on the upper side O, a second height h2 of the further ribs 10 also increases in a third section A3 which extends from the mounting section 9 in the direction of the circumferential boundary Ur. The second height h2 is at its maximum on a further end E2 of the third section A3. It decreases continuously in a fourth section A4 running from the further end E2 in the direction of the circumferential boundary Ur until it reaches zero.

The further ribs have a horizontal section Ah which serves as a support area on which to stack the agitating body 6 on the mounting section 9 of a further agitating body located beneath.

Figure 7:
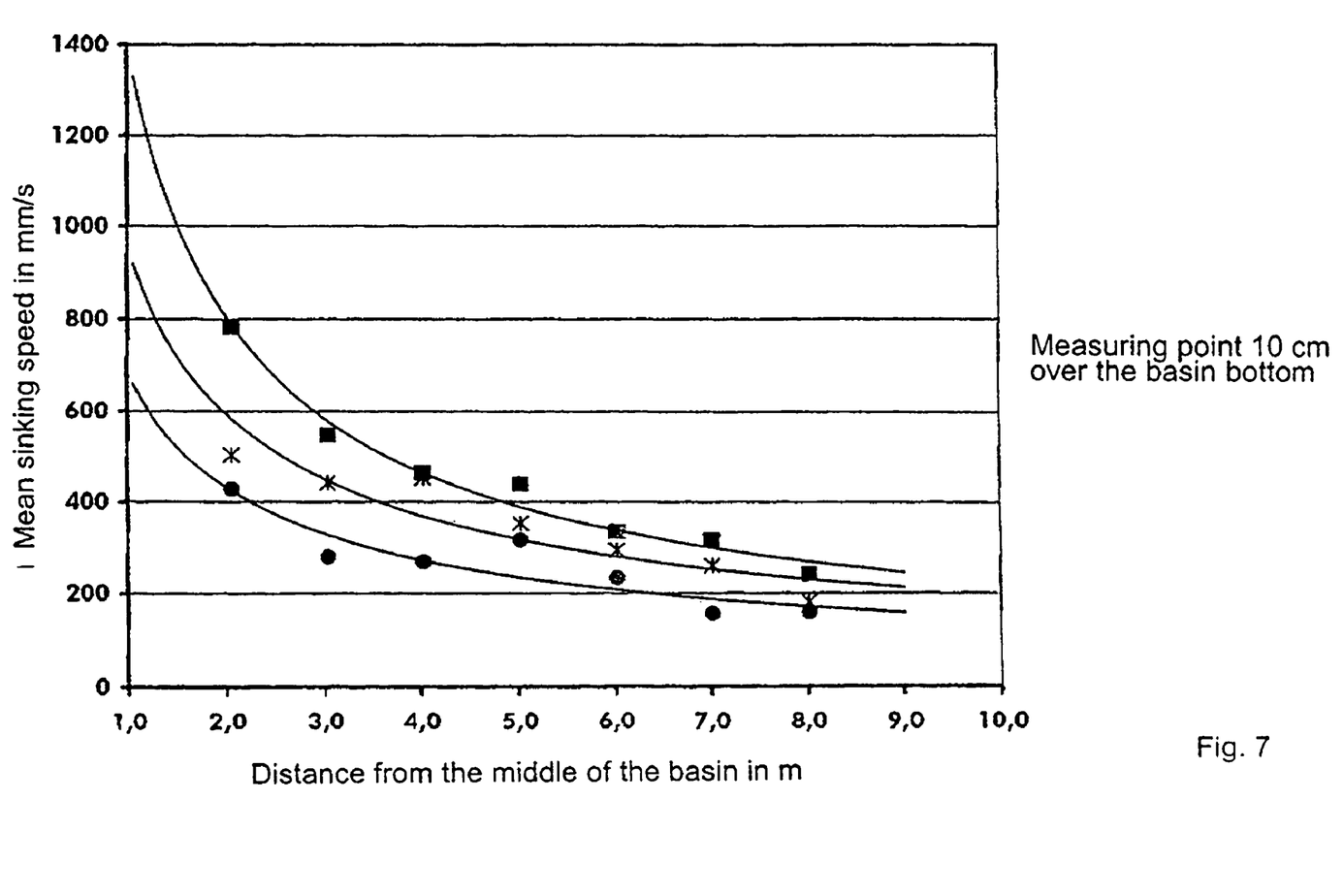

The advantageous effectiveness of the agitating device becomes particularly clear based on the compared measuring results shown in FIG. 7. The measured values marked with a circle were obtained with an agitating body on whose upper side ribs with a constant first rib height were provided. The measured values marked with an X were achieved with a further agitating body on whose upper side ribs with a constant second rib height were attached. The second rib height was greater than the first rib height. The measured values marked with squares were achieved with an agitating body provided by the invention. As shown comparatively in FIG. 7 the measured values impressively show the improved efficiency of the agitating body 6. A floor level speed achieved thereby on the bottom of a basin filled with a liquid is up to 30% greater than the floor level speeds which can be achieved with conventional agitating bodies.

Figure 8:
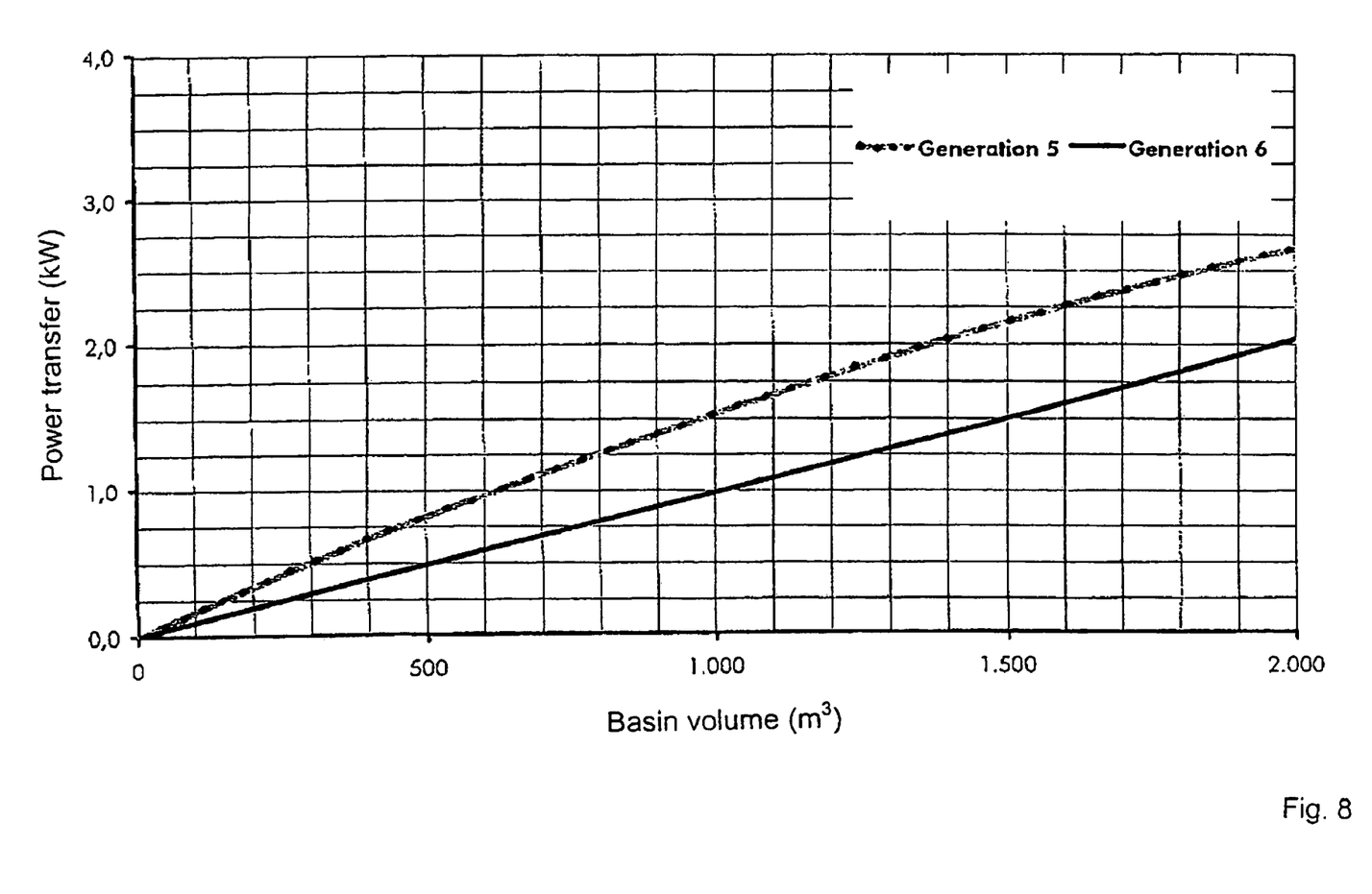

In FIG. 8 the power transfer of a conventional agitating body (generation 5) in comparison to an agitating body (generation 6) provided by the invention is spread over the basin volume.

With the conventional agitating body (generation 5) this was an agitating body which was known from DE 298 03 497 U1. As is shown in FIG. 8 an agitating body (generation 6) as provided by the invention at a basin volume of 1000 $m^3$ can for example reduce the power transfer by 40% in comparison to the conventional agitating body (generation 5).

Figure 9:
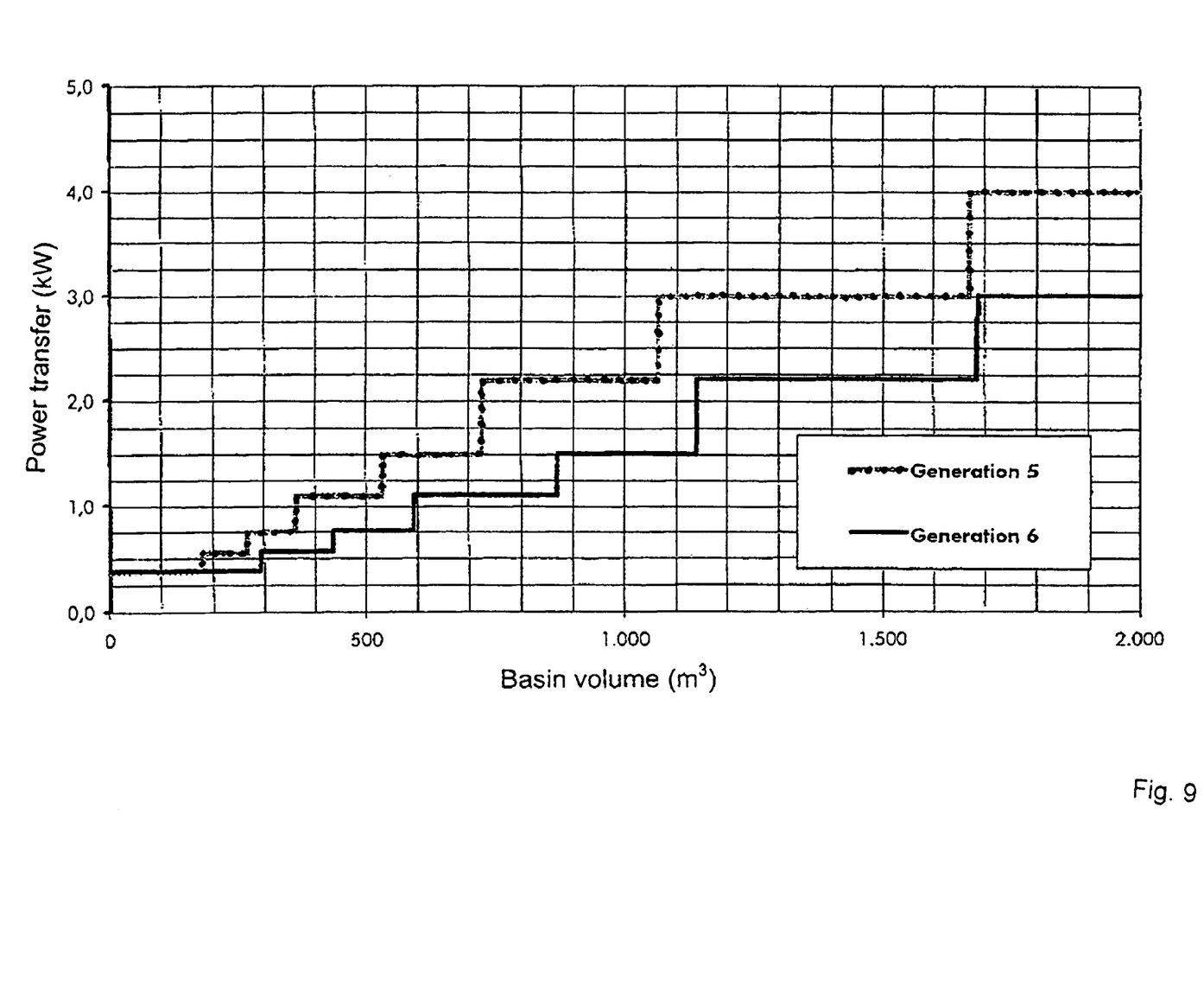

FIG. 9 shows the rated motor power for the conventional agitating body (generation 5) as per DE 298 03 497 U1 in comparison to the agitating body (generation 6) provided by the invention over the basin volume. As is shown in FIG. 9, the rated motor power to drive the compared agitating bodies at a basin volume of 1000 $m^3$ can be reduced from approximately 2.2 kW for the conventional agitating body (generation 5) to 1.5 kW for an agitating body (generation 6) provided by the invention. This corresponds to a savings in the power to be installed, i.e., the energy to be provided, of more than 30%.

REFERENCE DESIGNATION LIST

1 Frame
2 Drive unit
3 Gearing
4 Shaft
5 Flange
6 Agitating body
7 Rib
8 Breakthrough
9 Mounting section 10 Further ribs
A1 First section
A2 Second section
A3 Third section
A4 Fourth section
Ah Horizontal section
E1 First end
E2 Second end
F1 Steep edge
F2 Flat edge
h1 First height
h2 Second height
O Upper side
U Underside
Ur Circumferential boundary

The invention claimed is:

1. Agitating device comprising:
a hyperboloid-like agitating body connected with a drive unit via a shaft, wherein a plurality of first ribs is provided on an upper side of the agitating body running from a circumferential boundary in a direction of the shaft, and wherein
a first height of the first ribs increases at least in sections from the circumferential boundary of the agitating body in the direction of the shaft.

2. Agitating device as defined in claim 1, wherein the first height increases in a first section running from the circumferential boundary in the direction of the shaft and decreases in a second section running from a first end of the first section further in the direction of the shaft.

3. Agitating device as defined in claim 1, wherein the first ribs show a bend in a top view of the upper side.

4. Agitating device as defined in claim 3, wherein the bend is a hyperbolic bend.

5. Agitating device as defined in claim 1, wherein the agitating body has a plurality of breakthroughs provided in a vicinity of the shaft.

6. Agitating device as defined in claim 5, wherein the breakthroughs are arranged at regular intervals, at the same radial distance.

7. Agitating device as defined in claim 1, wherein a plurality of second ribs is provided on an underside of the agitating body opposite the upper side running in a direction of the circumferential boundary.

8. Agitating device as defined in claim 7, wherein the second ribs run radially.

9. Agitating device as defined in claim 7, wherein a second height of the second ribs increases in a third section running from a central area of the agitating body in the direction of the circumferential boundary and decreases in a fourth section running from a second end of the third section further in the direction of the circumferential boundary.

10. Agitating device as defined in claim 7, wherein the second ribs each have a horizontal section to support a further agitating element stacked beneath for transport or storage purposes.

11. Agitating device as defined in claim 7, wherein the agitating body together with the first ribs and/or the second ribs are manufactured from one piece fiber-reinforced plastic.

12. Sewage treatment unit with at least one agitating device as defined in claim 1, wherein the agitating element retained on the shaft protrudes into a basin and the drive unit is retained on a frame outside the basin.

13. Sewage treatment unit as defined in claim 12, wherein an aeration unit is provided in the basin.

14. Method for sewage treatment comprising the following steps:
a) providing a basin to hold sewage, an agitating device as provided by claim 1 as well as an aeration device provided in the basin,
b) filling the basin with sewage,
c) aerating the sewage with the aeration device for a specified amount of time,
d) agitating the sewage with the agitating device for a further specified amount of time,
e) turning off the agitating device so that a sludge contained in the sewage can settle, and
f) removing the treated sewage from the basin.

15. Method as defined in claim 14, wherein steps c and d are repeated alternately a plurality of times.

* * * * *